United States Patent
Trujillo

(10) Patent No.: US 7,654,717 B2
(45) Date of Patent: Feb. 2, 2010

(54) FIBER OPTICALLY ILLUMINATED SURFACE

(76) Inventor: Michael Trujillo, 22022 Broken Bow, Lake Forest, CA (US) 92630

( * ) Notice: Subject to any disclaimer, the term of this patent is extended or adjusted under 35 U.S.C. 154(b) by 111 days.

(21) Appl. No.: 11/904,350

(22) Filed: Sep. 27, 2007

(65) Prior Publication Data

US 2009/0086503 A1   Apr. 2, 2009

(51) Int. Cl.
 *F21V 5/00* (2006.01)
(52) U.S. Cl. ............... 362/576; 362/147; 362/554; 362/583; 362/602; 362/605; 52/28; 52/306
(58) Field of Classification Search ........... 52/28, 52/306; 362/145, 147, 153, 153.1, 554, 576, 362/583, 602, 604, 605
See application file for complete search history.

(56) References Cited

U.S. PATENT DOCUMENTS 5,548,492 A    8/1996  Hansen et al.
5,806,263 A *  9/1998  Coleman ............ 52/306
6,039,453 A    3/2000  Wang
6,256,811 B1   7/2001  Nelson
6,802,635 B2 * 10/2004 Robertson et al. ...... 362/576
7,269,862 B2 *  9/2007 Rooke et al. .......... 4/613

* cited by examiner

*Primary Examiner*—Stephen F Husar
(74) *Attorney, Agent, or Firm*—Stetina Brunda Garred & Brucker

(57) ABSTRACT

There is provided an illuminated surface mounted on a base surface. The illuminated surface includes a plurality of transmissive tiles configured to allow light to pass therethrough. Each of the transmissive tiles includes an exterior surface, an attaching surface and a plurality of lateral sides disposed between the exterior and attaching surfaces. The attaching surface is affixable to the base surface. The transmissive tiles are arranged in spaced relation to each other to define a cable channel. The cable channel is defined by opposing lateral sides of adjacent transmissive tiles. A fiber optic cable is in optical communication a light source and receives light therefrom. The fiber optic cable includes a longitudinal axis and a first segment disposed within the cable channel. The first segment is configured to radially radiate light along the longitudinal axis into the lateral sides of the adjacent transmissive tiles.

17 Claims, 3 Drawing Sheets

FIBER OPTICALLY ILLUMINATED SURFACE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention relates generally to fiber optic illumination and more particularly, to a fiber optic illumination device embedded within a surface to facilitate the illumination thereof.

2. Description of the Related Art

Over the years, advancements in lighting technology have provided improvements in lighting equipment beyond the conventional light bulb. For instance, neon lighting, light emitting devices and fiber optics have enabled more complex and innovative lighting applications. As such, lighting has evolved from purely utilitarian into an innovative art form.

Although improvements in lighting technology have led to the creation of many different lighting systems, fiber optic lighting systems offer a wide range of advantages over other lighting alternatives. A conventional fiber optic lighting system includes a series of fiber optic strands that are connected to a light source. Light is transmitted from the light source along the fiber optic cables. One particular advantage is that fiber optic systems are relatively safe. In a typical fiber optic system, there is very little, if any, electricity, heat, or UV light in the fiber optic cable. Consequently, fiber optic lighting systems may be ideal for lighting applications near water. Furthermore, fiber optics are very versatile in that many different colors may be generated from the single light source. Another advantage is that fiber optic lighting systems are typically very durable and require low maintenance.

One particular area in which fiber optic lighting systems have been employed is to enhance the aesthetic quality of a particular object or surface. In many cases, fiber optic cables are placed around a particular area to provide a frame or boarder. For instance, fiber optic cables have been placed around pools, decks, and bars to enhance the aesthetic quality thereof. Although a fiber optic frame or boarder enhances the aesthetics of a particular surface or area to a certain degree, it is very minimal. The surface itself is not illuminated which may result in a very dull space.

As is apparent from the foregoing, there exists a need in the art for an improved illumination system for use with various surfaces.

BRIEF SUMMARY OF THE INVENTION

According to an aspect of the present invention, there is provided an illuminated surface including a plurality of transmissive tiles configured to allow light to pass therethrough. Each of the transmissive tiles includes an exterior surface, an opposing attaching surface, and a plurality of lateral sides disposed between the exterior and attaching surfaces. The attaching surface is affixable to a base surface. When the transmissive tiles are affixed to the base surface, they are arranged in spaced relation relative to each other to define a cable channel. The cable channel is defined by opposing lateral sides of adjacent transmissive tiles. The illuminated surface further includes a light source that is operative to radiate light. A fiber optic cable is in optical communication with the light source to receive light from the light source. The fiber optic cable includes a longitudinal axis and a first segment disposed within the cable channel. The first segment is configured to radially radiate light along the longitudinal axis into the lateral sides of the adjacent transmissive tiles.

The present invention may provide a dramatic lighting effect to tiled surfaces. Such surfaces may be in hard to reach places making traditional lighting instillation and maintenance very difficult. The illuminated surface of the present invention improves the illumination and enhances the aesthetic quality of a particular surface.

It is contemplated that the illuminated surface may additionally include grout disposed within the cable channel to substantially conceal the fiber optic cable therein. The fiber optic cable is positioned between the grout and the attachment surfaces of the adjacent tiles. However, when the grout is disposed directly on the cable, the grout may block light radiated by the cable from entering the transmissive tiles. Accordingly, the illuminated surface may also include transparent caulk disposed within the cable channel to inhibit the grout from interfering with the transmission of light between the fiber optic cable and the adjacent transmissive tiles. The transmissive caulk is disposed between the fiber optic cable and the grout. The illuminated surface may further comprise a transmissive sleeve disposed the cable channel. A substantial length of the fiber optic cable may be disposed within the transmissive sleeve to inhibit the grout from interfering with the transmission of light between the fiber optic cable and the adjacent transmissive tiles. The transmissive sleeve is positioned within the cable channel such that it abuts the lateral sides of the transmissive tiles.

According to another aspect of the present invention, there is provided a method of constructing an illuminated surface. The method comprises the step of providing a light source and a fiber optic cable optically coupled thereto. The method further includes the step of affixing the plurality of transmissive tiles to a base surface, as described above to define a cable channel. Thereafter, a first segment of the fiber optic cable is disposed within the cable channel. The first segment is configured to radially radiate light along the longitudinal axis into the lateral sides of the adjacent transmissive tiles.

The present invention also includes a method of installing a prefabricated illuminated surface onto a support member. The method includes the step of providing a prefabricated illuminated surface comprising a plurality of transmissive tiles affixed to a mounting member to define a cable channel. The mounting member includes a tile surface and a support surface. The transmissive tiles are attached to the tile surface. The prefabricated illuminated surface also includes a light source and a fiber optic cable optically coupled thereto. The fiber optic cable is disposed within the cable channel to enable the transmission of light from the cable into the adjacent tiles. The method also includes the step of attaching the support surface of the mounting member to the support member.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Figure 1:
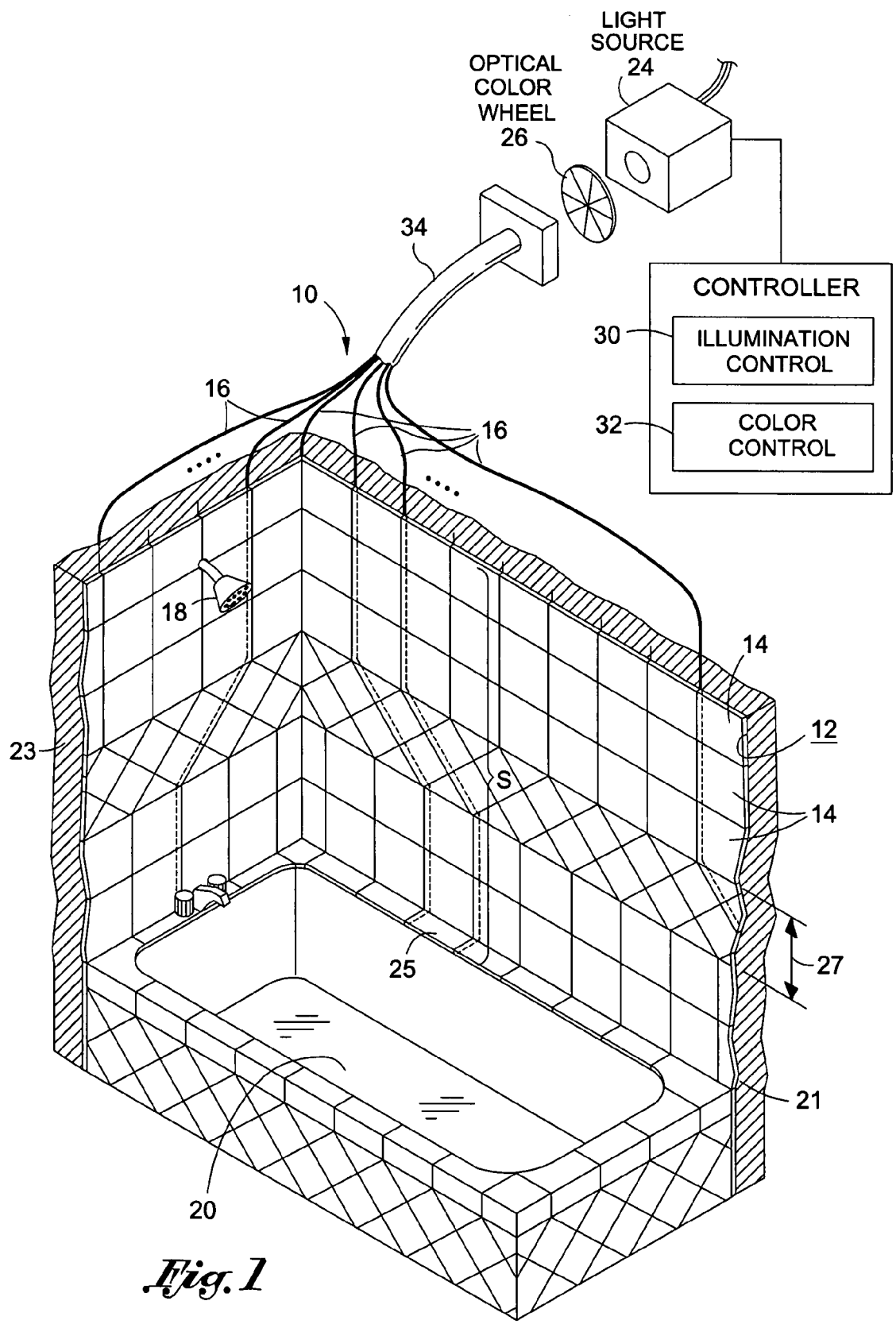
FIG. 1 is a top perspective view of an embodiment of an illuminated surface of the present invention constructed in a bathroom, the illuminated surface including a plurality of tiles and a plurality of fiber optic cables disposed between the tiles.
Figure 2:
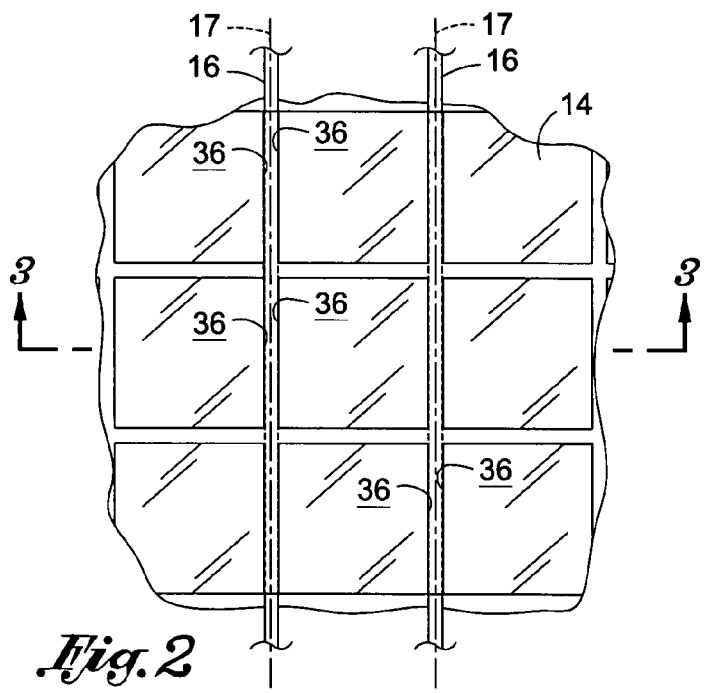
FIG. 2 is a cutaway top view of the tiles of the illuminated surface illustrated in FIG. 1, the fiber optic cables are disposed within respective cable channels, each cable channel being defined a lateral sides of adjacent tiles.

Referring now to the drawings wherein the showings are for purposes of illustrating a preferred embodiment of the present invention only, and not for purposes of limiting the same, FIGS. 1-6 depict an illuminated surface 10 constructed in accordance with the present invention.

It is contemplated that the present invention may be particularly useful when used in connection with tiled surfaces. Most tiled surfaces are comprised of a plurality of individual tiles mounted onto a base. An adhesive coating is applied to the backside of each tile before being placed on the base. In the case of clear tiles, the adhesive coating includes a coloring which transmits through the clear tiles. As such, the tiled surface maintains the color of the adhesive during the day. However, at night, the surface becomes dark and the coloring in the adhesive does not transmit through the tiles as well. Consequently, the illuminated surface 10 of the present invention aims at creating a surface having a visually striking appearance at any time of day.

According to various embodiments, the illuminated surface 10 includes a plurality of transmissive tiles 14 that are mountable on a base surface 12. The transmissive tiles 14 are configured to allow light to pass therethrough. According to various embodiments, the tiles 14 may be transparent or translucent. In other words, the tiles 14 may be clear to allow light to clearly pass through them, or the tiles 14 may be frosted to allow light to pass through them only diffusely. The tiles 14 may be comprised of glass, plastic (e.g., acrylic), or other materials known by those having skill in the art. Furthermore, the tiles 14 may be configured to be any size and shape as desired.

Figure 3:
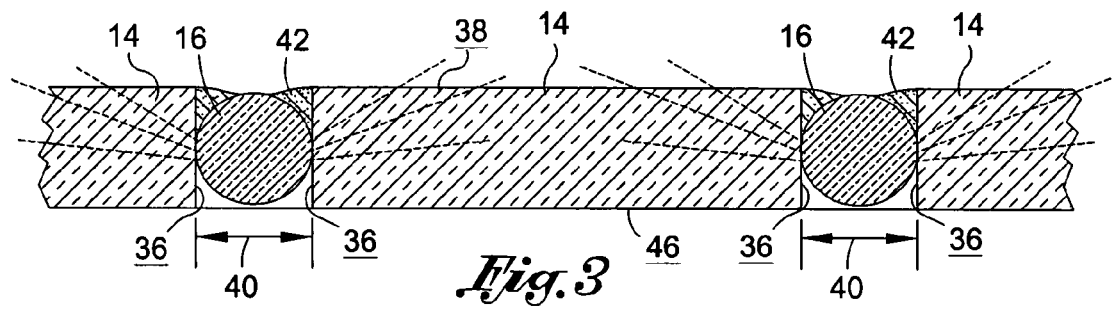
FIG. 3 is a cross-sectional side view of two fiber optic cables disposed within two cable channels, each fiber optic cable is positioned between grout and attachment surfaces of adjacent transmissive tiles.
Figure 4:
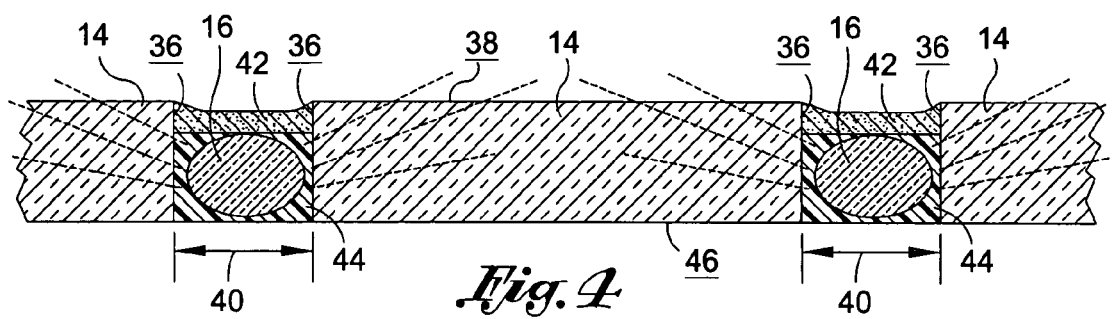
FIG. 4 is a cross-sectional side view of two fiber optic cables disposed within two cable channels, a transmissive caulk is disposed within each cable channel between the fiber optic cable and the grout.
Figure 5:
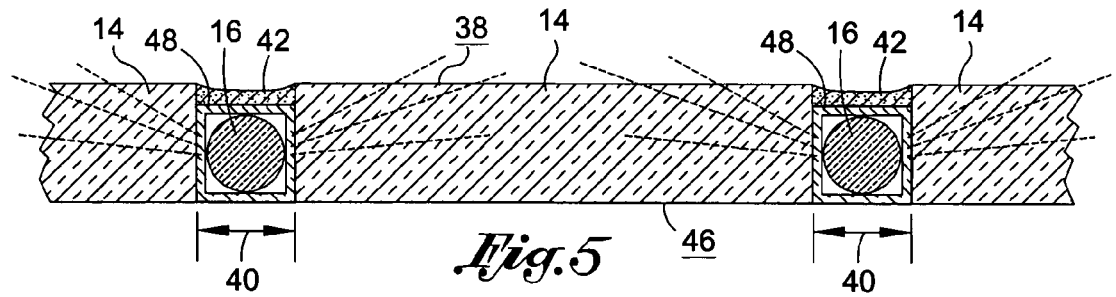
FIG. 5 is a cross-sectional side view of two fiber optic cables disposed within two cable channels and abuts lateral sides of adjacent transmissive tiles, a portion of each cable is disposed within the transmissive sleeve.
Figure 6:
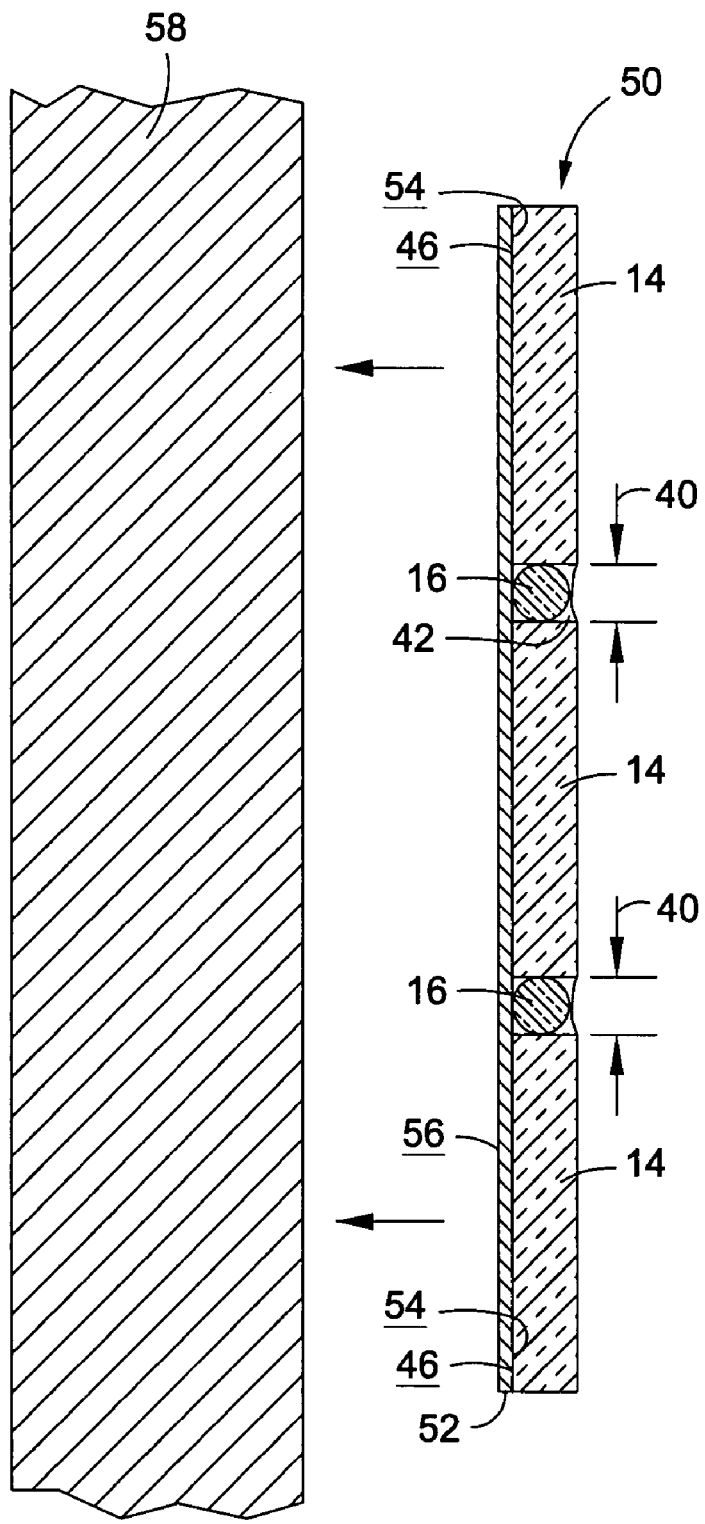
FIG. 6 is a cross-sectional top view of a prefabricated illuminated surface having a mounting member that is attachable to a support member.

Each of the tiles 14 include opposing exterior and attaching surfaces 38, 46. The tiles also include a plurality of lateral sides 36 disposed between the exterior and attaching surfaces 38, 46. In one embodiment, the lateral sides 36 are substantially perpendicular to the exterior and attaching surfaces 38, 46. The attaching surface 46 of each tile 14 is affixable to the base surface 12. When the present invention is used in wet lighting applications, such as the shower enclosure shown in FIG. 1, the tiles 14 may be affixed to waterboard or similar surfaces that are treated to be generally water impermeable. The tiles 14 are affixed to the base surface 12 in spaced relation to each other. The spacing between the tiles 14 defines a cable channel 40, as best illustrated in FIGS. 3-5. The cable channel 40 is defined by opposing lateral sides 36 of adjacent transmissive tiles 14.

The illuminated surface 10 of the present invention also includes a fiber optic cable 16 having a longitudinal axis 17. The fiber optic cable 16 is in optical communication with a light source 24 which is operative to radiate light therefrom. In this regard, the fiber optic cable 16 is able to receive light emitted from the light source 24. A first segment, "S" of the fiber optic cable 16 is disposed within one of the cable channels 40. The first segment S is configured to radially radiate light along the longitudinal axis 17 into the lateral sides 36 of adjacent transmissive tiles 14. According to one embodiment, the fiber optic cable 16 is a side-glow fiber optic cable configured to emit light along its length, as opposed to an end-emitting fiber optic cable, which is configured to emit light at its end. The light emitted by the fiber optic cable 16 is received within the tiles 14 and passes through the tiles 14. As the light passes through the tiles 14, the tiles 14 become illuminated.

The fiber optic cable 16 may be configured to be a variety of different shapes and sizes. FIGS. 3-5 show cross sections of fiber optic cables 16 disposed within the cable channels 40. The cables 16 shown in FIGS. 3 and 5 have substantially circular cross sections, whereas the cables 16 shown in FIG. 4 have generally oval-shaped cross sections. However, it is understood that the cross section of the cables 16 is not limited thereto and may include other shapes. Furthermore, the size of the cables 16 may vary. For instance, the cables 16 shown in FIG. 3 include a diameter that is substantially equal to the thickness of the tiles 14 while the cables 16 shown in FIG. 5 include a diameter that is less than the thickness of the tiles 14.

The illuminated surface 10 may be particularly suited for lighting applications near water, such as in a bathroom as shown in FIG. 1, or near a pool or fountain, though not shown. The fiber optic cables 16 have little or no electricity running through them, which makes them suitable for water applications. The shower enclosure shown in FIG. 1 includes two tiled walls 21, 23, a shower head 18, and a tub 20. Although the illuminated surface 10 as illustrated in FIG. 1 is shown in a shower enclosure, it is understood that the illuminated surface 10 may be used on any surface which is typically constructed of tile. Therefore, the illuminated surface 10 is not restricted to construction on a wall, and may be constructed on a floor, ceiling, shelf, ledge, etc.

Various embodiments of the present invention include modifications in order to alter the transmission of light from the fiber optic cables 16 into the transmissive tiles 14. The illuminated surface 10 becomes brighter as more light passes into the tiles 14. Therefore, in one embodiment, the lateral sides 36 of the tiles 14 are polished to enhance the transmission of light into the lateral sides 36. Furthermore, according to another embodiment, portions of the first segment S abut the lateral sides 36 of the tiles 16 to increase the amount of light that passes into the lateral sides 36 from the fiber optic cable 16, as shown in FIG. 3. It is understood that the first segment S may abut some, but not all of the lateral sides 36 comprising the cable channel 40. In this regard, the amount of light passing into the lateral sides 36 along the cable channel 40 may be adjusted by varying the distance between the cable 16 and the lateral sides 36.

According to another implementation of the invention, the illuminated surface 10 may include grout 42 disposed within the cable channel 40. The fiber optic cable 16 is positioned between the grout 42 and the attachment surfaces 46 of the adjacent transmissive tiles 14. In one embodiment, the grout 42 substantially covers and encapsulates the fiber optic cable 16. As such, the fiber optic cable 16 cannot be seen within the cable channel 40. The grout 42 may also prevent water or foreign debris from entering the cable channel 40.

Any crevice formed between the cable and the tiles 16 may be filled with grout 42. Consequently, the grout 42 may interfere with the transmission of light from the fiber optic cable 16 to the transmissive tile 14. In other words, the grout 42 may block the light emitted from the cable 16 from entering the transmissive tile 14. Therefore, another embodiment of the invention includes transmissive caulk 44 disposed within the cable channel 40 between the cable 16 and the grout 42. The caulk 44 forms a barrier between the cable 16 and the grout 42 to inhibit the grout 42 from interfering with the transmission of light between the fiber optic cable 16 and the adjacent transmissive tiles 14. The caulk 44 may also bias the cable 16 into the cable channel 40 to further restrain the cable 16 therein. The transmissive caulk 44 is configured to allow light to pass through it. The transmissive caulk 44 may allow complete transmission of light therethrough or only partial transmission of light therethrough. As shown in FIG. 4, the cable 16 is completely surrounded by the transmissive caulk 44. However, in another embodiment, the caulk 44 only partially covers the cable 16. For instance, if the cable 16 abuts the lateral side of the tile 14, the caulk 44 may only be needed on the upper portion of the cable 16.

In another embodiment, the illuminated surface 10 includes a transmissive sleeve 48 configured to allow light to pass through it, as best shown in FIG. 5. The sleeve 48 may be constructed of ABS or other materials known by those skilled in the art. The outside surfaces of the sleeve 48 may be roughened to accept adhesive on the backside and grout 42 on the frontside. Similar to the transmissive caulk 44 discussed above, the transmissive sleeve 48 may allow complete transmission of light therethrough or only partial transmission of light therethrough. The transmissive sleeve 48 is disposed within the cable channel 40 and abuts the lateral sides 36 of adjacent transmissive tiles 14, and the first segment S of fiber optic cable 16 is disposed within the transmissive sleeve 48. The transmissive sleeve 48 inhibits the grout 42 from interfering with the transmission of light between the fiber optic cable 16 and the adjacent transmissive tiles 14.

As stated above, the fiber optic cable 16 is in optical communication with a light source 24. The light source 24 may be disposed in spaced relation to the tiles 14. Consequently, it may be advantageous to dispose the light source 24 in a location that is convenient to access. Therefore, if maintenance is required (i.e., changing of a light bulb) the light source 24 may be easily accessible. For instance, the light source 24 may be disposed in the ceiling or in a wall adjacent to the illuminated surface 10. The light source 24 may be disposed behind an access door, which covers the light source 24 during operation, but enables quick and easy access to the light source 24 when maintenance and repair are needed.

According to another embodiment of the invention, a color wheel 26 is disposed between the light source 24 and the fiber optic cable 16. The color wheel 26 varies the wavelength of light emitted by the light source 24 and subsequently received by the fiber optic cable 16. By varying the wavelength of light, the color wheel 26 is able to change the color of light received and emitted by the fiber optic cables 16.

Another embodiment of the invention includes an illumination controller 30 in electrical communication with the light source 24. The illumination controller 30 is operative to control the intensity of light emitted by the light source 24. As the brightness of light emitted by the light source 24 increases, the brightness of the light emitted by the cables 16 also increases. Therefore, by controlling the brightness of light emitted by the light source 24, a user may control the brightness of the illuminated surface 10.

In a further embodiment, the illuminated surface 10 includes a color controller 32 in electrical communication with the color wheel 26. The color controller 32 is operative to vary the color of light emitted by the fiber optic cables 16 by controlling the color wheel 26. In one embodiment, the color wheel 26 is substantially circular and is rotatable about a rotation axis. The color wheel 26 also includes a plurality of color sections, wherein each color section represents a specific color. As the color wheel 26 rotates, respective color sections are separately brought into optical alignment with the fiber optic cable 16 and the light source 24. As a respective color section is brought into alignment with the light source 24 and the fiber optic cable 16, the color received by the fiber optic cable 16 is the specific color represented by the particular color section. Consequently, as the color wheel 26 rotates, the color of light received by the fiber optic cable varies 16. Therefore, the color controller 32 controls the color received by the fiber optic cable 16 by controlling the rotation of the color wheel 26.

The color controller 32 and illumination controller 30 may be conveniently positioned to allow easy control over the color and brightness of the illuminated surface 10. Therefore, in one embodiment, the controllers 30, 32 are located on the illuminated surface 10. In another embodiment, the controllers 30, 32 may be positioned near the illuminated surface 10, but not on the surface 10. In the shower enclosure shown in FIG. 1 it may be advantageous to position the controllers 32, 30 near the illuminated surface 10, but not on the illuminated surface 10, as the water from the shower may damage the wiring of the controllers 32, 30. In a further embodiment, the controllers 32, 30 may be located on a remote control that is in wireless communication with the light source 24 and the color wheel 26. The remote control enables the user to control the intensity and/or the color of the illuminated surface 10 from a remote location.

According to another embodiment, the illumination and color controllers 30, 32 are programmable by the user. In this regard, the user may program the light source 24 to turn on or off at a particular time. The illumination controller 30 may also be programmed to vary the intensity of light according to instructions provided by the user. Furthermore, the color controller 23 may be programmed to vary the color of light emitted by the fiber optic cables 16 according to instructions provided by the user.

It is contemplated that various embodiments of the present invention include a plurality of fiber optic cables 16 and a plurality of cable channels 40, as depicted in FIG. 1. Each of the fiber optic cables 16 shown in FIG. 1 are optically coupled to a single light source 24 and extend toward the tiles 14. However, it is understood that multiple light sources 24 may be used without departing from the spirit and scope of the present invention. Multiple light sources 24 may be used to emit different colors or intensities of light into different fiber optic cables 16. A portion of each fiber optic cable 16 may be bundled in a casing 34 to organize and simplify the routing of the cables 16 from the light source 24 to the tiles 14. The fiber optic cables 16 may branch out from the casing 34 into different sections of the illuminated surface 10. Furthermore, the fiber optic cables 16 may branch out from a single light source 24 into cable channels 40 located in first and second surfaces 21, 23 as shown in FIG. 1.

In one embodiment, each fiber optic cable 16 is disposed within a separate cable channel 40. The fiber optic cables 16 shown in FIG. 1 extend downwardly from the top of the first and second surfaces 21, 23 and end shortly before the intersection of the tiles 14 and the tub 20. The first segments S of fiber optic cables 16 are shown in phantom in FIG. 1, disposed within respective cable channels 40.

It is common for tiled surfaces to include a design section 27 wherein the orientation of the tiles 14 within the design section 27 is slightly altered relative to the orientation of the remaining tiles 14. The shower enclosure shown in FIG. 1 includes a design section 27, wherein the design section tiles 14 are rotated approximately 90° relative to the orientation of the remaining tiles 14. As shown in FIG. 1, the fiber optic cables 16 extend through the design section 27. The cables 16 are flexible to accommodate the different orientation of the tiles 14 comprising the design section 27. In this regard, the cables 16 bend within a given plane to accommodate changes in the tile orientation.

A single fiber optic cable 16 may also bend to extend within multiple surfaces within multiple planes. As shown in FIG. 1, the fiber optic cables 16 extends along the first and second surfaces 21, 23 and within the tub lip 25. In this regard, the cables 16 extend along a generally vertical surface (i.e. the first and second surfaces 21, 23) and a generally horizontal surface (i.e. the tub lip 25). The tub lip 25 extends out from the surfaces 21, 23 at approximately a 90° angle. Therefore, the cable 16 extends within the plane of the surfaces 21, 23 and the plane of the tub lip 25.

In addition to the foregoing, an aspect of the present invention also includes a method of constructing an illuminated surface 10. The method includes the step of providing a light source 24 and a fiber optic cable 16 as described above. The method further includes the step of affixing a plurality of transmissive tiles 14 to a base surface 12. The attaching surfaces 46 of the tiles 14 are attached to the base surface 12. The tiles 14 are affixed to the base surface 12 in spaced relation to each other to define a cable channel 40. Afterwards, a first segment S of the fiber optic cable 16 is disposed within the cable channel 40 to allow light to radiate into the adjacent transmissive tiles 14. The first segment S may be disposed in the cable channel 40 against at least some of the transmissive tiles 14 to enhance the transmission of light from the first segment S into the adjacent transmissive tiles 14.

According to another embodiment, the method further comprises the step of disposing grout 42 within the cable channel 40 having the fiber optic cable 16. The method may also include the step of disposing transmissive caulk 44 and/or the transmissive sleeve 48 within the cable channel 40 between the cable 16 and the grout 42. The transmissive caulk 44 and the transmissive sleeve 48 are operative to inhibit the grout 42 from interfering with the transmission of light between the fiber optic cable 16 and the adjacent transmissive tiles 14 as described above.

An aspect of the present invention also includes a method of installing a prefabricated illuminated surface 50 onto a support member 58. In this regard, the prefabricated illuminated surface 50 may be fabricated off-site and then installed on a support member 58 on-site. The method includes the step of providing a pre-fabricated illuminated surface 50. The prefabricated illuminated surface 50 includes a plurality of transmissive tiles 14 as described above. Each tile 14 is affixed to a mounting member 52. The mounting member 52 may include masonite backing, or other similar materials known by those skilled in the art. The mounting member 52 includes a tile surface 54 and a support surface 56. The attaching surface 46 of the tiles 14 are affixed to the tile surface 54 of the mounting member 52. The tiles 14 are arranged in spaced relation to each other to define a cable channel 40. The prefabricated illuminated surface 50 further includes a light source 24 and a fiber optic cable 16 as discussed above. The light source 24 and fiber optic cable 16 are in optical communication with each other. The fiber optic cable 16 receives light from the light source and emits the light into the adjacent transmissive tiles 14.

The method further includes the step of attaching the prefabricated illuminated surface 50 to the support member 58. In particular, the support surface 56 of the mounting member 52 is attached to the support member 58. A suitable adhesive known in the art may be used to attach the prefabricated illuminated surface 50 to the support member 58. In this regard, the prefabricated surface 50 may be quickly and easily installed at a desired location.

According to various embodiments, the prefabricated surface 50 may include grout 42 disposed within the cable channel 40 as discussed above to conceal the fiber optic cables 16. Furthermore, the prefabricated surface 50 may additionally include transmissive caulk 44 and/or a transmissive sleeve 48 as previously mentioned.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An illuminated surface for use on a base surface, the illuminated surface comprising:
   a plurality of transmissive tiles defining a pair of adjacent tile arrays, each transmissive tile being configured to allow light to pass therethrough, each transmissive tile having an exterior surface, an opposing attaching surface, and a plurality of lateral sides disposed between the exterior and attaching surfaces, the attaching surface being affixable to the base surface, the plurality of transmissive tiles being arranged in spaced relation to each other to define a cable channel, the cable channel being defined by opposing lateral sides of adjacent transmissive tiles;
   a light source being operative to radiate light; and
   a fiber optic cable in optical communication with the light source to receive light from the light source, the fiber optic cable having a longitudinal axis and a first segment disposed within the cable channel, the first segment being configured to radially radiate light along the longitudinal axis into the pair of adjacent tile arrays.

2. The illuminated surface of claim 1 wherein at least a portion of the first segment abuts at least some of the plurality of lateral sides defining the cable channel to enhance the transmission of light from the fiber optic cable into the adjacent transmissive tiles.

3. The illuminated surface of claim 1 wherein the plurality of transmissive tiles are comprised of glass.

4. The illuminated surface of claim 1 wherein the plurality of transmissive tiles are comprised of a plastic material.

5. The illuminated surface of claim 1 further comprising grout disposed within the cable channel, the fiber optic cable being positioned between the grout and the attachment surface of the adjacent transmissive tiles.

6. The illuminated surface of claim 5 further comprising a transmissive sleeve disposed within the cable channel, a substantial length of the first segment being disposed within the transmissive sleeve, the transmissive sleeve abutting the lateral sides of the transmissive tiles.

7. The illuminated surface of claim 5 further comprising transmissive caulk disposed within the cable channel, the transmissive caulk being disposed between the fiber optic cable and the grout.

8. The illuminated surface of claim 1 further comprising a color wheel in optical communication with the light source and the fiber optic cable, the color wheel being operative to vary the color of light received by the fiber optic cable from the light source.

9. The illuminated surface of claim 8 further comprising a color controller in electrical communication with the color wheel, the controller being operative to enable a user to control the color wheel.

10. The illuminated surface of claim 1 further comprising an illumination controller in electrical communication with the light source, the illumination controller being operative to vary the intensity of light emitted by the light source.

11. The illuminated surface of claim 1 wherein the attaching surface of at least one of the plurality of transmissive tiles is opaque.

12. A method of constructing an illuminated surface, the method comprising the steps of:
   a. providing a light source and a fiber optic cable optically coupled thereto, the light source being operative to radiate light and the fiber optic cable being configured to receive light therefrom, the fiber optic cable having a longitudinal axis;
   b. affixing a plurality of transmissive tiles to a base surface, the plurality of transmissive tiles being arranged in two adjacent tile arrays, each of the transmissive tiles having an exterior surface, an opposing attaching surface, and a plurality of lateral sides disposed between the exterior and attaching surfaces, the attaching surface being affixed to the base surface, the plurality of transmissive tiles being affixed to the base surface in spaced relation to each other to define a cable channel, the cable channel being defined by opposing lateral sides of adjacent transmissive tiles; and
   c. disposing a first segment of the fiber optic cable within the cable channel, the first segment being configured to radially radiate light along the longitudinal axis into the pair of adjacent tile arrays.

13. The method of claim 12 wherein step (c) comprises abutting the first segment against at least some of the adjacent transmissive tiles to enhance the transmission of light from the first segment into the adjacent transmissive tiles.

14. The method of claim 12 further comprising the step of disposing grout within the cable channel, the fiber optic cable being positioned between the grout and the attachment surface of the adjacent transmissive tiles.

15. The method of claim 14 further comprising the step of disposing transmissive caulk within the cable channel, the transmissive caulk being disposed between the fiber optic cable and the grout.

16. The method of claim 14 wherein step (c) includes:
   providing a transmissive sleeve;
   disposing the transmissive sleeve within the cable channel, the transmissive sleeve abutting the lateral sides of the transmissive tiles; and
   disposing the first segment of the fiber optic cable within the transmissive sleeve.

17. The method of claim 12 wherein step (a) includes further providing a color wheel in optical communication with the light source and the fiber optic cable, the color wheel being operative to vary the color of light received by the fiber optic cable from the light source.

* * * * *